United States Patent [19]

Ma

[11] Patent Number: 5,271,765
[45] Date of Patent: Dec. 21, 1993

[54] AQUEOUS CATIONIC DYE-BASED INK JET INKS

[75] Inventor: Sheau-Hwa Ma, Chadds Ford, Pa.

[73] Assignee: E. I. Du Pont de Nemours and Company, Wilmington, Del.

[21] Appl. No.: 829,244

[22] Filed: Feb. 3, 1992

[51] Int. Cl.$^5$ ............................................. G09D 11/00
[52] U.S. Cl. ..................... 106/22 D; 106/20 D; 106/22 K; 8/657; 8/554; 8/555
[58] Field of Search ................... 106/20-22, 106/554-555; 8/554-555, 657-659, 557

[56] References Cited

U.S. PATENT DOCUMENTS

| | | | |
|---|---|---|---|
| 2,168,337 | 8/1939 | Heckert | 8/55 |
| 3,973,901 | 8/1976 | Micchelli et al. | 8/10.1 |
| 4,292,037 | 9/1981 | Galafassi et al. | 8/554 |
| 4,459,130 | 7/1984 | Helling et al. | 8/554 |
| 4,834,797 | 5/1989 | Toyofuku et al. | 106/2 |
| 4,834,799 | 5/1989 | Song | 106/22 |
| 4,892,775 | 1/1990 | Song | 428/195 |
| 5,085,698 | 2/1992 | Ma et al. | 106/20 |

FOREIGN PATENT DOCUMENTS 103274 4/1990 Japan .

*Primary Examiner*—Helene Klemanski
*Assistant Examiner*—Margaret Emsmann

[57] ABSTRACT

Ink jet ink compositions which comprise an aqueous carrier medium; a cationic dye; and a cationic polymer have excellent crusting behavior and kogation property and may be used with a variety of ink jet printers such as continuous, piezoelectric, drop-on-demand and thermal or bubble jet drop-on-demand, and are particularly adapted for use in thermal ink jet printers.

19 Claims, No Drawings

AQUEOUS CATIONIC DYE-BASED INK JET INKS

FIELD OF THE INVENTION

This invention relates to aqueous inks for ink jet printers. More particularly, this invention relates to aqueous cationic dye-based ink jet inks having improved crusting behavior and kogation properties.

BACKGROUND OF THE INVENTION

Ink jet printing is a non-impact printing process in which a digital signal produces droplets of ink on media substrates such as paper or transparency films. Ink jet is widely used in industrial and office applications. Thermal or bubble jet drop-on-demand ink jet printers are the generally accepted medium price printers for personal computers. These printers have been widely accepted due to their high print quality, low cost, relatively quiet operation, environmental safety and color graphic capability.

The use of aqueous based inks for ink jet printers is well-known. The prior art ink jet inks generally use anionic dyes which contain a plurality of sulfonate or carboxylate anionic groups for their high solubility in aqueous solution. While the use of the more preferred cationic dyes, which have very desirable color properties such as brilliant hues and high chroma, some of them being fluorescent, is also known, their use is quite limited due to their relatively low solubility in an aqueous vehicle. The solubility can be significantly improved by lowering the pH of the ink to about 2, but the acidic environment tends to cause degradation of the pen components by inducing corrosion on the metal parts.

The low solubility of the dyes in general tend to cause the following problems in the ink jet printing mechanism.

1) Crusting, a persistent problem associated with aqueous based inks, describes the tendency of a ink to crust over a period of time, eventually leading to plugging of the orifice in the printer mechanism from which droplets of ink are expelled. Crusting is primarily the crystallization of the solid ink components around the orifice in the printhead, causing partial or full blockage of the orifice, leading to misdirection of the ink drop or prevention of drop ejection. The crusting problem arises from the evaporation of the liquid vehicle and the consequent precipitation of the solid ink components, primarily the dyes.

2) Kogation, unique to thermal ink jet printing, describes the extent of decomposition of the ink components on the resistors of the ink jet pen as a consequence of repeatedly heating to high temperatures during printing. The decomposition products on the resistors will affect the bubble formation which is used to propel the ink droplets toward the substrate.

Attempts have been made to solve the crusting problem by adding hygroscopic agents to reduce the rate of water evaporation by their ability to pick up water vapor from the air. While some improvement has been realized with this approach, a total solution to this problem has not been achieved. Further, it appears that no methods are known to prevent crusting or kogation of the cationic dyes in mildly acidic to mildly basic aqueous ink compositions (pH 4 to 9). Accordingly, there is a need in the art to provide an ink composition for ink jet printing which permits the use of the more desirable cationic dyes without the attendant crusting and kogation problems noted above.

SUMMARY OF THE INVENTION

In accordance with this invention there is provided an aqueous ink jet ink composition comprising:
(a) an aqueous carrier medium, present in a major amount;
(b) a cationic dye; and
(c) a cationic polymer.

The inks of the invention have excellent crusting behavior and kogation properties. They may be used with a variety of ink jet printers such as continuous, piezoelectric, drop-on-demand and thermal or bubble jet drop-on-demand, and are particularly adapted for use in thermal ink jet printers.

DETAILED DESCRIPTION OF THE INVENTION

This invention relates to an ink jet ink composition which is particularly suited for use in ink jet printers in general, and thermal ink jet printers in particular. These inks are stable over long periods, both in storage and in the printer. The inks may be adapted to the requirements of a particular ink jet printer to provide a balance of light stability, smear resistance, viscosity, surface tension, optical density, and crust resistance.

AQUEOUS CARRIER MEDIUM

The aqueous carrier medium comprises water (preferably deionized water) or a mixture of water and at least one water soluble organic solvent. The aqueous carrier medium is present in a major amount of the ink composition, i.e., in the range of approximately 65 to 99.89%, preferably approximately 85 to 98.5% based on total weight of the ink.

Representative examples of water-soluble organic solvents are disclosed in Assignee's patent application U.S. Ser. No. 07/508,145 filed Apr. 11, 1990, the disclosure of which is incorporated herein by reference Selection of a suitable mixture of water and water soluble organic solvent depends upon the requirements of the specific application, such as desired surface tension and viscosity, the selected dye, drying time of the ink, and the type of substrate onto which the ink will be printed.

A mixture of a water soluble organic solvent having at least 2 hydroxyl groups (diethylene glycol, triethylene glycol, butyl carbitol, etc.) and deionized water is preferred as the aqueous carrier medium. The aqueous carrier medium usually contains from about 5% to about 95% water, with the remainder (i.e., 95% to about 5%) being the water soluble organic solvent. The preferred ratios are approximately 60% to about 95% water, based on the total weight of the aqueous carrier medium. Most preferably, the aqueous vehicle comprises about 90% water and the balance a glycol ether such as butyl carbitol. Higher concentrations of glycols may result in poor print quality. Lower concentrations will lead to drying out of the printhead or "crusting" of the ink.

CATIONIC DYES

Cationic dyes are those dyes which yield colored cations in aqueous solution. Such dyes are well known to those of ordinary skill in the art. The types of cationic dyes that are most useful in this invention include mainly the basic dyes and some of the mordant dyes that are designed to bind acidic sites on a substrate, such as fibers.

Useful types of such dyes include the azo compounds, diphenylmethane compounds, triarylmethanes, xanthene compounds, acridine compounds, quinoline compounds, methine or polymethine compounds, thiazole compounds, indamine or indophenol compounds, azine compounds, oxazine compounds, and thiazine compounds, among others, all of which are well known to those skilled in the art.

The color and amount of cationic dye used in the ink composition is largely a function of choice, being primarily dependent upon the desired color of the print achieved with the ink. Low concentrations of dye may not give adequate color vividness. High concentrations may result in poor printhead performance or unacceptably dark colors. The cationic dye is present in the amount of 0.01 to 10%, by weight, preferably 0.05 to 8% by weight, more preferably 1 to 5%, by weight, based on the total weight of the ink.

CATIONIC POLYMER

The cationic polymer comprises a backbone prepared from ethylenically unsaturated units and having at least one pendant ionic moiety derived from a cationic unit on the monomer and being of the general formula:

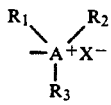

wherein A is N, P, or S; $R_1$–$R_3$ are each independently H, alkyl or alkyl ether of 1–20 carbon atoms, or aryl or alkylaryl having 1–9 carbon atoms, with the proviso that $R_3$ is not present when A is S; and wherein X is an anion selected from the group consisting of halides, conjugate bases of organic acids, and conjugate bases of inorganic acids.

The cationic polymer may be a homopolymer, copolymer, AB block polymer, BAB triblock polymer, or branched or graft polymer. Methods of preparing such polymers are numerous and well known to those skilled in the art, such as, for example, by free radical solution, emulsion, suspension, bulk polymerization and the like (using a chain transfer agent, if necessary), or by stepwise polymerization processes. The graft form may be prepared by copolymerizing a preformed macromonomer or by grafting onto an existing polymeric backbone. The AB and BAB block polymers are advantageously produced by stepwise polymerization process such as anionic or group transfer polymerization as described in Webster, U.S. Pat. No. 4,508,880, the disclosure of which is incorporated herein by reference. Polymers so produced have precisely controlled molecular weight, block sizes and very narrow molecular weight distributions.

The cationic polymer comprises ethylenically unsaturated monomers and contains at least one cationic unit. The cationic units can be in the required quaternary or tertiary configurations as polymerized, or more typically and preferably, are amine, phosphine, or thioether compounds which are converted to the quaternary or tertiary state after the formation of the basic polymer structure. Functional monomers or polymers may be reacted with a molecule to generate potential cationic centers, such as attaching an amine group by reacting a copolymer of glycidyl methacrylate with dimethylamine.

The cationic polymer may also contain non-ionic ethylenically unsaturated monomers. Examples of useful non-ionic monomers include methyl methacrylate, n-butyl methacrylate, ethyl acrylate, propyl acrylate, styrene and vinyl biphenyl. Examples of useful cationic monomers include diethylaminoethyl methacrylate, t-butylaminoethyl methacrylate, acrylamide, dimethylacrylamide, 2-trimethylammonium ethyl acrylic methosulfate, 2-trimethylammoniumethyl acrylic chloride, 4-aminostyrene, 2-vinyl pyridine, diphenylvinylphosphine, vinyltriphenylphosphonium bromide, allyltriphenylphosphonium bromide, allylmethylsulfide, and phenylvinylsulfide.

Salts of the amino monomers can be made with the counter component being selected from organic acids such as acetic acid, formic acid, oxalic acid, dimethylol propionic acid, halogens such as chloride, fluoride, and bromide, and inorganic acids, such as sulfuric acid, phosphoric, and nitric acid, and the like. The amino group can also be converted into a tetra-alkyl ammonium salt by reacting the tertiary amines with compounds such as benzyl chloride, methyl p-toluene sulfonate, dimethyl sulfate, methyl iodide, and the like.

The phosphonium and sulfonium salts are preferably made by reacting a halogenated copolymer (e.g., 2-bromoethyl methacrylate) with tri-substituted phosphines (e.g., triphenylphosphine) or di-substituted sulfides (e.g., dimethylsulfide).

Preferred cationic polymers are the phosphate and tetra-alkyl ammonium salts of homopolymers or copolymers of dialkylaminoethyl methacrylate, where alkyl is methyl to butyl.

The cationic polymer is present in the range of approximately 0.1 to 25% by weight of the total ink composition, preferably in the range of approximately 0.5% to 10%. If the amount of polymer becomes too high, the ink color density will be unacceptable and it will become difficult to maintain desired ink viscosity.

OTHER INGREDIENTS

The ink may contain other ingredients which are well known in the art. Surfactants may be used to alter surface tension as well as maximize penetration, and may be cationic, amphoteric or nonionic. Useful surfactants may be selected from *McCutcheon's Emulsifiers and Detergents*, Manufacturing Confectioners Publishing Company, Glen Rock, N.J. In aqueous inks, the surfactants may be present in the amount of 0.01–5% and preferably 0.2–2%.

The choice of surfactant is highly dependent on the type of substrate to be printed. Examples of surfactants which were found to be useful in printing on Gilbert Bond paper (25% cotton) (Mead Company, Dayton, Ohio) include: Surfynol® 465H, Aerosol® OT, Aerosol® MA-80, Duponol® RA, Merpol® SH, Zelec® NK, Polyethylene Glycol 600, Renex® 30, Synthrapol® KB, Triton® X 114, Silwet® L-77, UCON® ML1281, and Hamposyl® Lida. It is expected that one skilled in the art can select the appropriate surfactant for the specific substrate to be used in printing.

Biocides may be present to inhibit growth of microorganisms. Dowicides® (Dow Chemical, Midland, Mich. 48674), Omidines® (Olin Corp., Cheshire, Conn. 06410), Nuosept® (Huls America, Inc., Piscataway, N.J.), Nopcocides ® (Henkel Corp, Ambler, Pa. 19002), Troysans ® (Troy Chemical Corp., Newark, N.J. 17105) and sodium benzoate may be used.

In addition, sequestering or chelating agents, such as EDTA, may also be included to eliminate deleterious effects of heavy metal impurities. Other additives, such as humectants and viscosity modifiers may be added to the ink. Optionally, other acrylic and non-acrylic polymers may be added to improve properties such as water fastness and smear resistance. Compounds to adjust and/or maintain the pH of the ink between about 4 and 7.5 may also be mentioned.

INK PROPERTIES

Jet velocity, separation length of the droplets, drop size, and stream stability are greatly affected by the surface tension and the viscosity of the ink. Suitable ink jet inks should have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cP to about 10.0 cP at 20° C.

The inks of this invention have physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. They also have excellent storage stability for a long period and do not clog in an ink jet apparatus. Fixing the ink on the image recording material, such as, paper, fabric, film, etc., can be carried out rapidly and accurately.

Images printed with the inks of the present invention have clear color tones, high density, excellent water resistance and lightfastness. Furthermore, the ink does not corrode parts of the ink jet printing device it comes in contact with, and it is essentially odorless.

This invention will now be further illustrated by the following examples.

EXAMPLES

Cationic polymers were prepared using the procedure outlined below:

Preparation 1: Diblock polymer of methyl methacrylate (10 units)/copolymer of methyl methacrylate (5 units) and dimethylaminoethyl methyl methacrylate (7.5 units)—Acetate Salt A 12-liter flask was equipped with a mechanical stirrer, thermometer, $N_2$ inlet, drying tube outlet, and addition funnels. Tetrahydrofuran ("THF"), 3943 gm, and p-xylene, 2.4 gm, were charged to the flask. The catalyst, tetrabutyl ammonium m-chlorobenzoate, 2.6 ml of a 1.0M solution in acetonitrile, was then added. Initiator, 1-methoxy-1-trimethylsiloxy-2-methyl propene, 274.1 gm (1.57M) was injected. Feed I [methyl methacrylate ("MMA"), 780 gm (7.8M), and 2-dimethylaminoethyl methacrylate ("DMAEMA"), 1846 gm (11.76M)] was started at 0.0 minutes and added over 45 minutes. One hundred minutes after Feed I was completed (over 99% of the monomers had reacted), Feed II [methyl methacrylate, 1556 gm (15.6M) was started and added over 30 minutes.

At 400 minutes, 546 gm of dry methanol were added to the above solution and distillation was begun. A total of 2025 gm of solvent was removed. I-propanol, 1331 gm, was added after completion of the distillation. This made a MMA//MMA/DMAEMA 10//5/7.5 diblock polymer at 53.6% solids and a Mn=2700.

The acetate salt was obtained by neutralizing the above polymer (100%) with 3.6 grams of acetic acid per 40 grams of the polymer solution and mixing until a homogeneous solution was obtained. After neutralization, the material was reduced to approximately 15 Wt. % solids with 99.9 grams of deionized water.

EXAMPLE 1

A 1% red ink jet ink with a pH of 5.59 was prepared by stirring the following ingredients to dissolve the solids.

| INGREDIENT | AMOUNT (gm) |
| --- | --- |
| Rhodamine 6G* | 0.2 |
| Block polymer from Prep. 1 | 3.0 |
| Diethylene glycol | 1.9 |
| Deionized water | 14.9 |
| Total | 20.0 |

*~95% dye content; Aldrich Chemical Co., Milwaukee, WI

The ink was filled into a thermal ink jet pen and printed with a Hewlett Packard DeskJet printer (Hewlett Packard, Palo Alto, Calif.). Very smooth printing and high density images with sharp edges was observed on a wide range of papers. A control (pH=3.71) without the polymer failed to dissolve the dye completely, and could not be made into a useful ink.

EXAMPLE 2

A 1.5% magenta ink jet ink with a pH of 4.89 was prepared by stirring the following ingredients to dissolve the solids.

| INGREDIENT | AMOUNT (gm) |
| --- | --- |
| Rhodamine B* | 0.3 |
| Block polymer from Prep 1 | 3.0 |
| Deionized water | 16.7 |
| Total | 20.0 |

*~90% content, Eastman Kodak Co., Rochester, NY

The ink was filled into a thermal ink jet pen and printed with a Hewlett Packard DeskJet printer (Hewlett Packard, Palo Alto, Calif.). Very smooth printing with high density, sharp images was observed on a wide range of papers. The pen continuously printed for about 8 MM dots/nozzle without failing and no kogation was detected on the resistors. The ink also had very good storage properties. Heating at 75° C. for 24 hours had no effect on the ink.

A control (pH=2.70) without the polymer failed to completely dissolve the dye. The mixture was filled into a thermal ink jet pen and print tested as above. The print quality was poor with missing dots. There were crystals growing around the nozzle areas and many nozzles became irreversibly blocked after a short period of time.

EXAMPLE 3

A 1.5% magenta ink jet ink with a pH of 4.35 was prepared by stirring the following ingredients to dissolve the solids.

| INGREDIENT | AMOUNT (gm) |
| --- | --- |
| Rhodamine B from Ex. 2 | 0.3 |
| Block polymer from above | 3.0 |
| Butyl carbitol | 2.0 |
| Deionized water | 14.7 |
| Total | 20.0 |

The ink was filled into a thermal ink jet pen and printed with a Hewlett Packard DeskJet printer (Hewlett Packard, Palo Alto, Calif.). The ink printed very smoothly and dried quickly on a range of papers.

A control (pH=2.02) without the polymer also printed very nicely. However, there was a severe dye crystal growth problem around the nozzle area. Addition of N,N-dimethylethanolamine to increase pH caused dye precipitation.

EXAMPLE 4

A 1.5% magenta ink jet ink with a pH of 4.44 was prepared by stirring the following ingredients to dissolve the solids.

| INGREDIENT | AMOUNT (gm) |
| --- | --- |
| Rhodamine B from Ex. 2 | 0.3 |
| Polymer* | 3.0 |
| Butyl carbitol | 2.0 |
| Deionized water | 14.7 |
| Total | 20.0 |

*Methyl Methacrylic Acid/Dimethylaminoethyl Methacrylic Acid-Acetate Salt (79/21 by weight); 15% solution.

The ink was filled into a thermal ink jet pen and printed with a Hewlett Packard DeskJet printer (Hewlett Packard, Palo Alto, Calif.). The ink printed smoothly and dried quickly on the papers.

EXAMPLE 5

A 2% yellow ink jet ink with a pH of 5.54 was prepared by stirring the following ingredients to dissolve the solids and filtering through a Whatman filter paper.

| INGREDIENT | AMOUNT (gm) |
| --- | --- |
| Auramine O* | 0.5 |
| Block polymer from Prep. 1 | 3.0 |
| Butyl carbitol | 2.0 |
| Deionized water | 14.5 |
| Total | 20.0 |

*~80% dye content, Aldrich Chemical Co., Milwaukee, WI

The ink was filled into a thermal ink jet pen and printed with a Hewlett Packard DeskJet printer (Hewlett Packard, Palo Alto, Calif.). The ink printed very smoothly to give high density bright fluorescent yellow images and dried very quickly on the papers. A control (pH=5.02) without the polymer failed to dissolve the dye completely and could not be made into a useful ink.

What is claimed is:

1. An aqueous ink jet ink composition comprising:
   (a) an aqueous carrier medium, present in a major amount;
   (b) a cationic dye present in the amount of 0.01 to 10% by weight based on the weight of the ink; and
   (c) a catonic polymer salt present in the amount of 0.1 to 25% by weight based on the weight of the ink.

2. The ink according to claim 1, wherein the cationic polymer comprises a backbone prepared from ethylenically unsaturated units and having at least one pendant ionic moiety derived from a cationic unit on the monomer and being of the general formula:

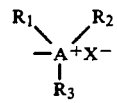

wherein A is N, P, or S; $R_1$–$R_3$ are each independently H, alkyl or alkyl ether of 1-20 carbon atoms, or aryl or alkylaryl having 1-9 carbon atoms, with the proviso that $R_3$ is not present when A is S; and wherein X is an anion selected from the group consisting of halides, conjugate bases of organic acids, and conjugate bases of inorganic acids.

3. The ink according to claims 1 or 2, wherein the cationic polymer is a homopolymer of dialkylaminoethyl methacrylate, where alkyl is methyl through butyl.

4. The ink according to claims 1 or 2, wherein the cationic polymer is a copolymer of dialkylaminoethyl methacrylate, where alkyl is methyl through butyl.

5. The ink according to claims 1 or 2, wherein the cationic polymer is a polymer selected from the group consisting of homopolymers, copolymers, AB block polymers, BAB triblock polymers, branched polymers and graft polymers.

6. The ink according to claim 5, wherein the cationic polymer is an AB block polymer.

7. The ink according to claim 6, wherein the AB block polymer consists of an A block comprising homopolymers or copolymers prepared from methyl methacrylate and butyl methacrylate and a B block comprising homopolymers or copolymers prepared from dimethylaminoethyl methacrylate or diethylaminoethyl methacrylate.

8. The ink according to claim 7, wherein the A block is a homopolymer of methyl methacrylate and wherein the B block is a copolymer of methyl methacrylate and dimethylaminoethyl methacrylate.

9. The ink according to claim 7, wherein the A block is a homopolymer of butyl methacrylate and the B block is a homopolymer of dimethylaminoethyl methacrylate.

10. The ink according to claims 1 or 2, wherein the dye is selected from the group consisting of azo compounds, diphenylmethane compounds, triarylmethane compounds, xanthene compounds, acridine compounds, quinoline compounds, methine compounds, polymethine compounds, thiazole compounds, indamine compounds, indophenyl compounds, azine compounds, oxazine compounds, and thiazine compounds.

11. The ink according to claim 1, wherein said ink contains approximately 1 to 5% dye, 0.5 to 10% polymer, and 85 to 98.5% aqueous carrier medium.

12. The ink according to claim 11, wherein the aqueous carrier medium comprises water or a mixture of water and at least one water soluble organic solvent.

13. The ink according to claim 12, wherein the aqueous carrier medium is a mixture of water and a polyhydric alcohol.

14. The ink according to claim 1, wherein the aqueous carrier medium comprises water or a mixture of water and at least one water soluble organic solvent.

15. The ink according to claim 14, wherein the aqueous carrier medium is a mixture of water and a polyhydric alcohol.

16. The ink according to claim 1 wherein the surface tension is in the range of approximately 30 to 70 dyne/cm and the viscosity is in the range of approximately 1.0 to 10.0 cP at 20° C.

17. The ink according to claims 1 or 2, wherein the ink further comprises a surfactant.

18. The ink according to claims 1 or 2, wherein the pH of the ink is in the range of from about 4 to about 7.5.

19. An aqueous ink jet ink composition comprising
a) an aqueous carrier medium selected from the group consisting of water and a mixture of water and at least one water soluble organic solvent, said aqueous carrier medium being present in the range of from about 65% to about 99.89% by weight based on the total weight of the ink composition;
b) a cationic dye selected from the group consisting of azo compounds, diphenylmethane compounds, triarylmethane compounds, xanthene compounds, acridine compounds, quinoline compounds, methine compounds, polymethine compounds, thiazole compounds, indamine compounds, indophenyl compounds, azine compounds, oxazine compounds, and thiazine compounds, said cationic dye being present in the range of from about 0.01% to about 10% by weight based on the total weight of the ink composition;
c) a cationic polymer comprising a backbone prepared from ethylenically unsaturated units and having at least one pendant ionic moiety derived from a cationic unit on the monomer and being of the general formula:

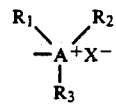

wherein $R_1$-$R_3$ are each independently H, alkyl or alkyl ether of 1-20 carbon atoms, or aryl or alkylaryl having 1-9 carbon atoms; and wherein X is an anion selected from the group consisting of halides, conjugate bases of organic acids, and conjugate bases of inorganic acids;
   i) wherein said cationic polymer is a polymer selected from the group consisting of homopolymers, copolymers, AB block polymers, BAB triblock polymers, branched polymers and a graft polymers,
   ii) said cationic polymer being present in the range of from about 0.1% to about 25% by weight based on the total weight of the ink composition; and
d) a surfactant;
wherein the viscosity of said ink composition is in the range of about 1.0 to about 10.0 cP at 20° C.; wherein the surface tension of said ink composition is in the range of about 30 to about 70 dyne/cm; and wherein the pH of said ink composition is from about 4 to about 7.5.

* * * * *